US008039147B2

(12) United States Patent
Lee et al.

(10) Patent No.: US 8,039,147 B2
(45) Date of Patent: Oct. 18, 2011

(54) RECHARGEABLE SECONDARY BATTERY HAVING IMPROVED SAFETY AGAINST PUNCTURE AND COLLAPSE

(75) Inventors: Donghyun Lee, Suwon-si (KR); Jeongwon Oh, Suwon-si (KR); Heungtaek Shim, Suwon-si (KR); Yoontai Kwak, Suwon-si (KR)

(73) Assignee: SB Limotive Co., Ltd., Yongin-si (KR)

( * ) Notice: Subject to any disclaimer, the term of this patent is extended or adjusted under 35 U.S.C. 154(b) by 0 days.

(21) Appl. No.: 12/610,214

(22) Filed: Oct. 30, 2009

(65) Prior Publication Data

US 2010/0279160 A1    Nov. 4, 2010

Related U.S. Application Data

(60) Provisional application No. 61/237,647, filed on Aug. 27, 2009.

(51) Int. Cl.
*H01M 6/08* (2006.01)

(52) U.S. Cl. ............ 429/164; 429/94; 429/159; 429/161

(58) Field of Classification Search .................. 429/161, 429/94, 164, 159
See application file for complete search history.

(56) References Cited

U.S. PATENT DOCUMENTS

| 2002/0034685 A1 | 3/2002 | Sato et al. |
| 2003/0044677 A1 | 3/2003 | Naruoka |
| 2003/0129479 A1 | 7/2003 | Munenaga et al. |
| 2005/0287431 A1 * | 12/2005 | Cho ............................. 429/161 |
| 2006/0121341 A1 * | 6/2006 | Hosoda et al. ................ 429/161 |
| 2009/0092889 A1 * | 4/2009 | Hwang et al. .................. 429/94 |

FOREIGN PATENT DOCUMENTS

| EP | 0 780 920 A1 | 6/1997 |
| EP | 2 048 736 A1 | 4/2009 |
| JP | 2002093402 A * | 3/2002 |
| JP | 2006-222077 | 8/2006 |
| KR | 2002-0018961 | 3/2002 |
| KR | 10-0876268 | 12/2008 |

OTHER PUBLICATIONS

European Search Report dated Sep. 2, 2010, for corresponding European Patent application 10165931.6.

* cited by examiner

*Primary Examiner* — Barbara Gilliam
*Assistant Examiner* — Zachary Best
(74) *Attorney, Agent, or Firm* — Christie, Parker & Hale, LLP (57) ABSTRACT

A rechargeable battery according to embodiments of the present invention has improved safety against puncture and collapse. The secondary battery includes an electrode assembly, a case, a first electrode terminal and a second electrode terminal, a cap plate, and a short circuit member. The electrode assembly includes a first electrode, a separator, and a second electrode. The case contains the electrode assembly. The first electrode terminal and a second electrode terminal are electrically connected to the first electrode and the second electrode of the electrode assembly, respectively. The short circuit member extends from the end of one of the first electrode and the second electrode and is wound around the outermost periphery of the electrode assembly to short circuit the electrode assembly when the secondary battery is punctured or collapsed.

13 Claims, 7 Drawing Sheets

RECHARGEABLE SECONDARY BATTERY HAVING IMPROVED SAFETY AGAINST PUNCTURE AND COLLAPSE

CROSS REFERENCE TO RELATED APPLICATION

This application claims priority to and the benefit of U.S. Provisional Patent Application No. 61/237,647, filed on Aug. 27, 2009 in the United States Patent and Trademark Office, the entire content of which is incorporated herein by reference.

BACKGROUND

1. Field

The following description relates to a rechargeable secondary battery, and more particularly to a rechargeable secondary battery with improved safety against puncture and collapse.

2. Description of Related Art

Lithium ion secondary batteries are widely used as a power source for small electronic devices such as notebook computers and cellular phones. In addition, because lithium ion secondary batteries have high output density, high capacity, and are light weight, they are also being used in hybrid and electric automobiles.

Lithium ion secondary batteries used as a power source of automobiles should satisfy safety and reliability requirements under severe conditions. There are a plurality of test categories for safety, among which, three of the most extreme test categories include puncture, collapse, and overcharge.

The puncture and collapse tests are performed to estimate secondary battery related damage in the event of a car accident and thus are very important test categories for safety. Specifically, in nail puncture tests, such as a nail penetration test, and collapse tests, the battery should not excessively increase in temperature after puncture or collapse.

SUMMARY

Aspects of the present invention are directed toward a rechargeable battery having improved safety against puncture and collapse.

A rechargeable battery according to an exemplary embodiment of the present invention includes a first electrode, a second electrode, and a separator between the first electrode and the second electrode. A rechargeable battery may include a case containing the electrode assembly and electrically connected to the second electrode. A rechargeable battery may include a cap plate combined to the case. A rechargeable battery may also include a short circuit member electrically connected to the first electrode and wound around the electrode assembly.

A first end of the short circuit member may overlap a boundary between the short circuit member and the first electrode. The short circuit member may be wound around the electrode assembly up to seven times.

A rechargeable battery may include a second electrode assembly, and the short circuit member may include a first short circuit member wound around the second electrode assembly.

A rechargeable battery may include a second electrode assembly, and the short circuit member may be integrally wound around all the electrode assemblies.

A separator may be included on both sides of the short circuit member.

The short circuit member may be made of a metal foil. The short circuit member may also have a metal foil that includes an active material. The metal foil of the short circuit member may be copper foil or aluminum foil.

The short circuit member may be formed of a different material than that of the case.

The first electrode may include a first uncoated region extending to a first side of the electrode assembly and a portion of the short circuit member may be welded to the first uncoated region.

A rechargeable battery may also include a first terminal. The short circuit member, the first uncoated region, and the first electrode terminal may be electrically connected.

The first electrode may include a metal foil and an active material, a portion of the first electrode may be longer than the second electrode, and the portion of the first electrode that extends beyond the second electrode is the short circuit member. The short circuit member may be a portion of the metal foil and a portion of the active material.

The first electrode may include a metal foil, and the metal foil of the first electrode may extend beyond the second electrode to form a short circuit member.

DESCRIPTION OF REFERENCE NUMERALS INDICATING SOME ELEMENTS IN THE DRAWINGS

100: Secondary battery according to an embodiment
110: Electrode assembly
111a: First metal foil
111c: First uncoated region
112a: Second metal foil
112c: Second uncoated region
120: Case
111: First electrode
111b: First active material
112: Second electrode
112b: Second active material
113a, 113b: Separator
121a, 121b: Wide lateral surface -continued

| | |
|---|---|
| 122a, 122b: Narrow lateral surface | 123: Bottom surface |
| 130: First electrode terminal | 131: Welding region |
| 132: First extension | 133: Second extension |
| 134: Bolt extension | 135: Nut |
| 140: Second electrode terminal | 141: Welding region |
| 142: First extension | 143: Second extension |
| 144: Bolt extension | 150: Cap plate |
| 151a, 151b: Insulating material | 152: Electrolyte plug |
| 153: Safety vent | 160: Short circuit member |
| 162a: Second metal foil | 162b: Second active material |
| 162c: Second uncoated region | |
| 160a, 160b, 160c, 160d, 160e, | |
| 160f: Welded mark | |

DETAILED DESCRIPTION

Exemplary embodiments will now be described more fully with reference to the accompanying drawings; however, they may be embodied in different forms and should not be construed as limited to the embodiments set forth herein. Rather, these embodiments are provided so that the disclosure is thorough and complete, and will fully convey the scope of the invention to those skilled in the art.

In rechargeable secondary batteries according to embodiments of the present invention, because the short circuit member is at an exterior of the electrode assembly, the short circuit member is firstly short circuited when the secondary battery is punctured or collapsed. As the short circuit member has relatively low resistivity, a small amount of heat is generated when a short circuit occurs, and the electric energy of the secondary battery is quickly consumed. Therefore, the safety and reliability of a secondary battery may be significantly improved.

Figure 1A:
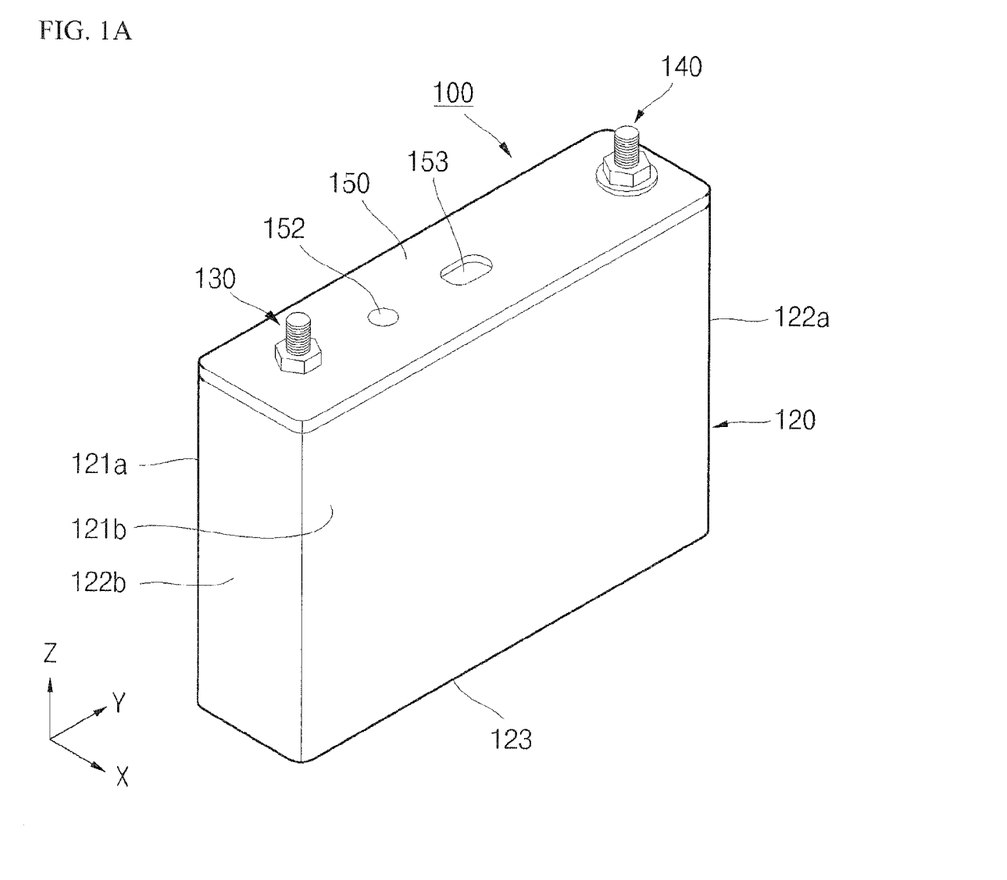
FIG. 1A is a perspective view of a secondary battery according to a first exemplary embodiment of the present invention.
Figure 1B:
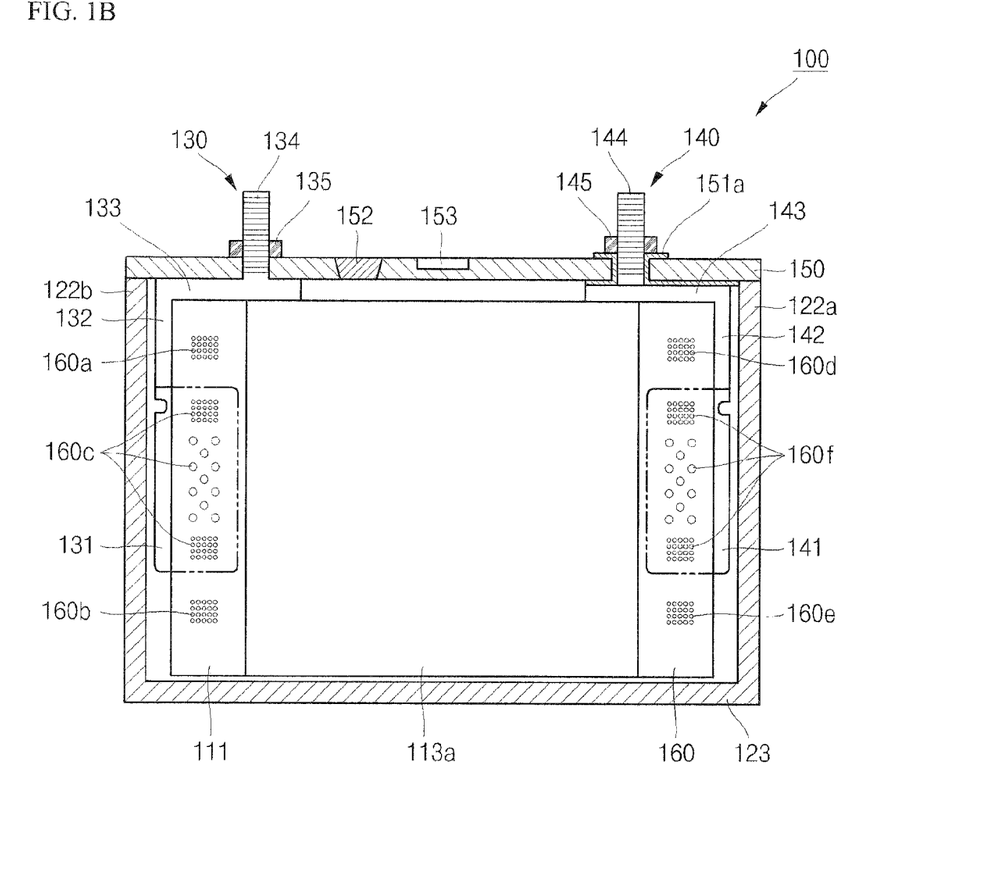
FIG. 1B is a cross-sectional view of FIG. 1A.
Figure 1C:
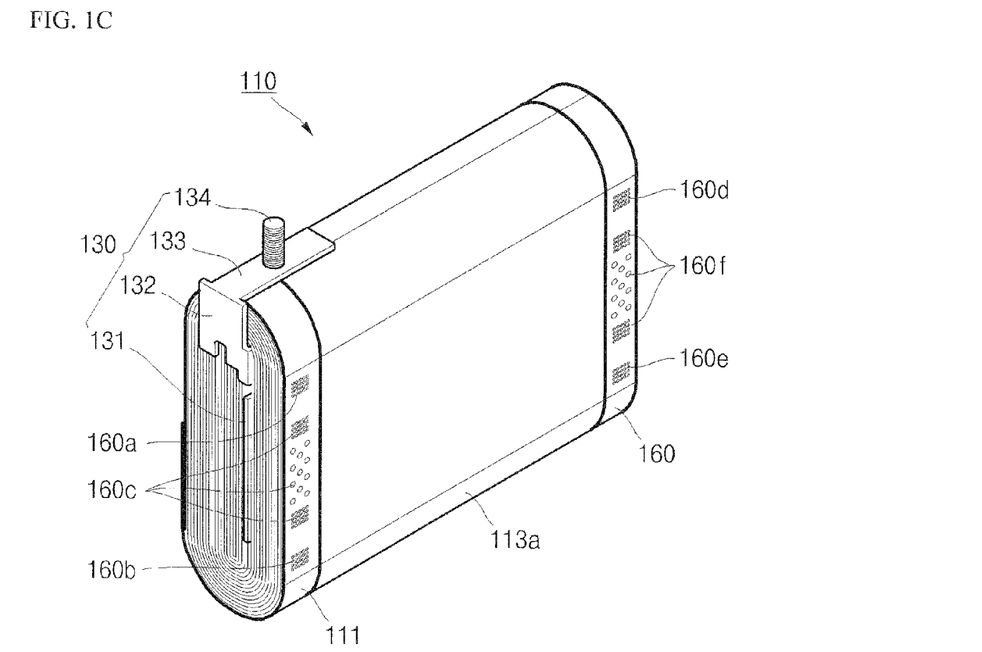
FIG. 1C is a perspective view of an electrode assembly and electrode terminal according to the first exemplary embodiment of the present invention.

FIG. 1A is a perspective view of a secondary battery according to a first exemplary embodiment of the present invention, FIG. 1B is a cross-sectional view of FIG. 1A, and FIG. 1C is a perspective view of an electrode assembly and an electrode terminal according to the first exemplary embodiment of the present invention.

FIG. 1A depicts a secondary battery 100 having improved safety against puncture and collapse according to an embodiment of the present invention. The secondary battery includes an electrode assembly 110, a can 120, a first electrode terminal 130, a second electrode terminal 140, a cap plate 150, and a short circuit member 160. In some embodiments, the can 120 is referred to as a case.

The electrode assembly 110 includes a first electrode, a separator, and a second electrode. The wound electrode assembly 110 has a jelly roll shape. The first electrode may be a positive electrode, and the second electrode may be a negative electrode. Alternatively, the first electrode may be a negative electrode, and the second electrode may be a positive electrode. The first electrode includes a first metal foil and a first active material. When the first electrode is the positive electrode, the first metal foil may be formed of aluminum, and the first active material may include lithium based oxide. Also, the second electrode includes a second metal foil and a second active material. When the second electrode is the negative electrode, the second metal foil may be formed of copper, and the second active material may include graphite. However, embodiments of the present invention are not limited to these materials. The separator may be formed of porous polyethylene (PE), polypropylene (PP), or other equivalents. The separator may be on both lateral surfaces of the first electrode or the second electrode. Furthermore, the first electrode may include a first uncoated region in which a positive electrode active material is not included. The first uncoated region may protrude beyond one side of the separator. Also, the second electrode may include a second uncoated region in which a negative electrode active material is not included. The second uncoated region may protrude beyond the other side of the separator. That is, the first uncoated region and the second uncoated region may protrude beyond the separator in opposite directions. This structure will be described below in more detail.

The can 120 includes two wide lateral surfaces 121a and 121b, two narrow lateral surfaces 122a and 122b, and one bottom surface 123. Also, the can 120 has an open upper portion. The electrode assembly 110 is received into the can 120 together with an electrolyte. Here, the first uncoated region and the second uncoated region of the electrode assembly 110 extend toward the two narrow lateral surfaces 122a and 122b of the can 120, respectively. The can 120 may be formed of aluminum, copper, iron, SUS, ceramic, and polymer, or any other suitable material. Furthermore, the can 120 may be substantially electrically connected to one of the first electrode or the second electrode. That is, the can 120 may have one polarity, either positive or negative. When the can is polarized, an inner surface of the can 120 may be coated with an electrical insulating material to prevent the can 120 from being unnecessarily electrically short circuited.

The first electrode terminal 130 and the second electrode terminal 140 are electrically connected to the first electrode and the second electrode, respectively. That is, the first electrode terminal 130 may be welded to the first electrode, and the second electrode terminal 140 may be welded to the short circuit member 160 and the second electrode. More specifically, the first electrode terminal 130 may be welded to the first uncoated region of the first electrode of the electrode assembly 110. Also, the second electrode terminal 140 may be welded to the second uncoated region of the second electrode of the electrode assembly 110 together with the short circuit member 160. This structure will be described below in more detail.

Reference numerals 160a and 160b of FIG. 1B represent marks at which the short circuit member 160 and the first uncoated regions of the first electrode of the electrode assembly 110 may be welded to each other. Reference numeral 160c represents marks at which the first uncoated region of the first electrode of the electrode assembly 110 may be welded to the first electrode terminal 130. Also, reference numerals 160d and 160e of the FIG. 1B represent marks at which the short circuit member 160 and the second uncoated region of the second electrode of the electrode assembly 110 may be welded to each other. Reference numeral 160f represents a mark at which the short circuit member 160 and the second uncoated region of the second electrode of the electrode assembly 110 may be welded to the second electrode terminal 140.

The first electrode terminal 130 includes a welding region 131, a first extension 132, a second extension 133, and a bolt extension 134. The welding region 131 is inserted into the first uncoated region of the first electrode of the electrode assembly 110. Also, the second electrode terminal 140 includes a welding region 141, a first extension part 142, a second extension part 143, and a bolt extension 144. The welding region 141 is inserted into the second uncoated region of the second electrode of the electrode assembly 110. In addition, each of the bolt extensions 134 and 144 of the first electrode terminal 130 and the second electrode terminal 140 pass through the cap plate 150 to protrude to an exterior of the case.

The cap plate 150 allows the first electrode terminal 130 and the second electrode terminal 140 to protrude to an exterior of the case and additionally covers the can 120. A boundary between the cap plate 150 and the can 120 may be welded using a laser. In addition, each of the bolt extensions 134 and 144 of the first electrode terminal 130 and the second electrode terminal 140 pass through the cap plate 150. As the bolt extension 134 of the first electrode terminal 130 directly contacts the cap plate 150, the cap plate 150 and the can 120 have the same polarity as the first electrode terminal 130. When the first electrode terminal 130 has a positive charge, the cap plate 150 and the can 120 have a positive charge. Also, when the first electrode terminal 130 has a negative charge, the cap plate 150 and the can 120 have a negative charge. In addition, an insulating material may be disposed on an outer surface of the bolt extension 144 of the second electrode terminal 140. Thus, the second electrode terminal 140 may be electrically insulated from the cap plate 150. Hereinafter, it will be assumed that the first electrode terminal 130 has a positive charge.

Nuts 135 and 145 are coupled to the bolt extensions 134 and 144 of the first electrode terminal 130 and the second electrode terminal 140, respectively. Thus, the first electrode terminal 130 and the second electrode terminal 140 are firmly fixed to the cap plate 150. Furthermore, an electrolyte plug 152 may be coupled to the cap plate 150. A safety vent 153 having a relatively thin thickness may be disposed on the cap plate 150. The cap plate 150 may be formed of the same material as the can 120.

The short circuit member 160 extends from the first electrode or the second electrode and is wound around the outermost periphery of the electrode assembly 110. Thus, when the secondary battery 110 is punctured or collapsed, the short circuit member 160 is firstly short circuited together with the can 120. Since the short circuit member 160 extends from the first electrode or the second electrode of the electrode assembly 110, the short circuit member short circuits the entire electrode assembly 110.

The short circuit member 160 is wound about one to seven times around the exterior of the electrode assembly 110. When the short circuit member 160 is wound around of the short circuit member 160 less than one time, the short circuit member 160 may not cause a short circuit when the secondary battery 100 is punctured or collapsed because the short circuit member 160 does not cover the entire electrode assembly. In other words, the puncture or collapse could occur at a place where the short circuit member 160 is not present. Also, when the short circuit member 160 is wound around the electrode assembly 110 more than seven times, the electrode assembly 110 may not be inserted into the can 120 because the electrode assembly 110 with the short circuit member 160 is too big. As a result, in order to insert an electrode assembly 110 that includes a short circuit member 160 that has been wound around the electrode assembly 110 more than seven times, the electrode assembly 110 is reduced in size, reducing the capacity of the secondary battery 100.

The separator 113a is around an approximately central portion of the electrode assembly 110. The first electrode 111 extends beyond one side of the separator 113a, and the short circuit member may extend beyond the other side of the separator 113a. That is, the first electrode 111 may protrude in a front direction of the separator 113a, and the short circuit member 160 may protrude in a rear direction of the separator 113a. The relation between the short circuit member 160 and the electrode assembly 110 will be described below in more detail.

Figure 2A:
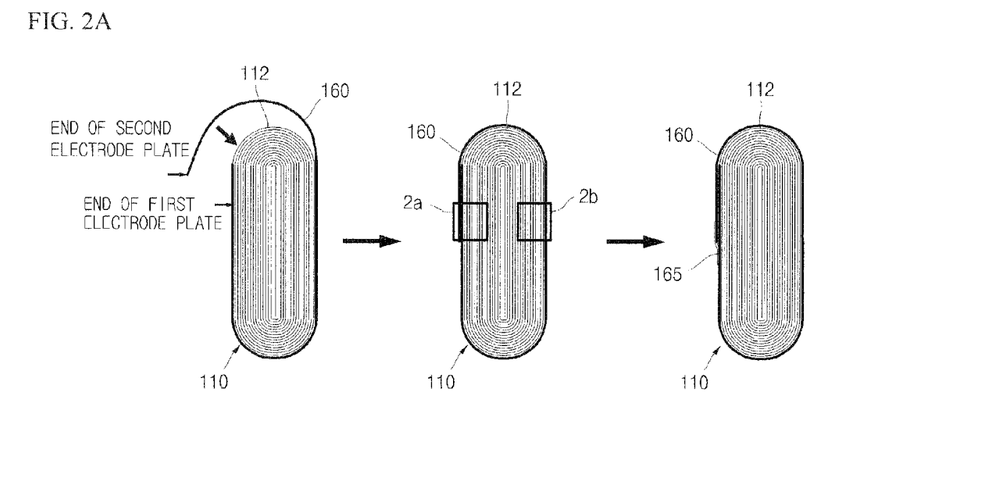
FIG. 2A illustrates a process in which a short circuit member is wound around an electrode assembly in a secondary battery having improved safety against puncture and collapse according to an embodiment.
Figure 2B:
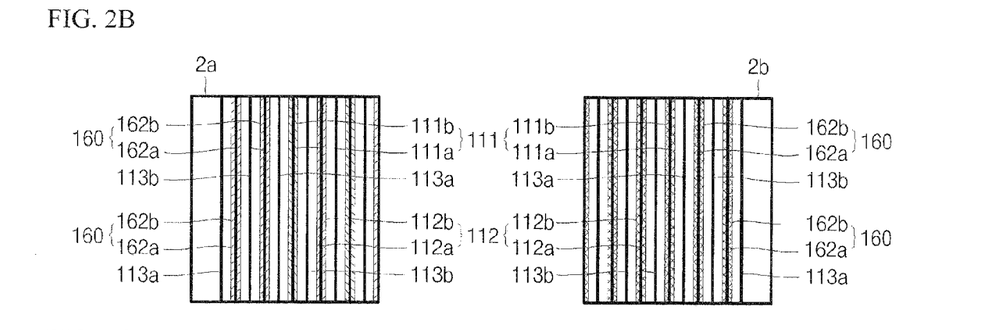
FIGS. 2B and 2C illustrate enlarged views of region 2*a* and region 2*b* of FIG. 2A.
Figure 2C:
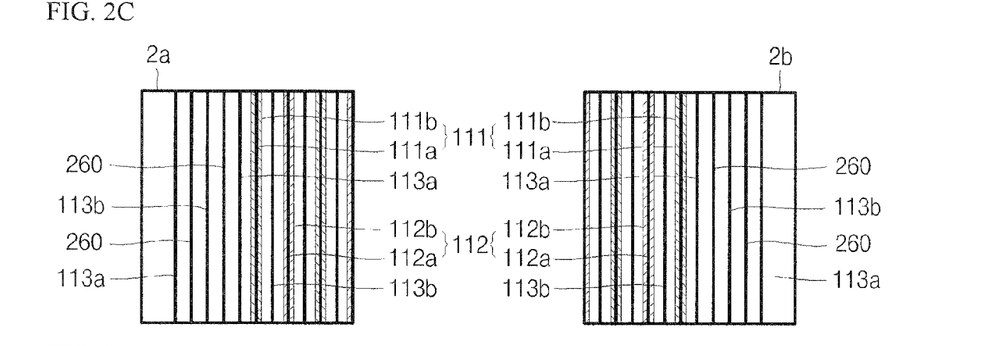

FIG. 2A illustrates a process in which a short circuit member is wound around an electrode assembly in a secondary battery having improved safety against puncture and collapse according to an embodiment, and FIGS. 2B and 2C illustrate enlarged views of region 2a and region 2b of FIG. 2A.

Referring to 2A, the short circuit member 160 may extend from the second electrode 112 of the electrode assembly 110 and be wound around the electrode assembly 110. That is, the sum of lengths of the second electrode 112 and the short circuit member 160 is longer than that of the first electrode 111. Thus, the short circuit member 160 is manufactured and wound during a manufacturing process of the electrode assembly 110. In addition, after the short circuit member 160 is wound, a sealing tape 165 is adhered to an exterior of the short circuit member to prevent the short circuit member 160 from being loosed from the electrode assembly 110.

Referring to FIG. 2B, the short circuit member 160 includes a second metal foil 162a extending from the second electrode 112 of the electrode assembly 110 and a second active material 162b. Here, the second metal foil 162a may include a copper foil, and the second active material 162b may include graphite. In addition, the separators 113a and 113b may be disposed on both lateral surfaces of the short circuit member 160, respectively. Also, although the short circuit member 160 is wound about two times in FIG. 2B, it is not limited thereto.

The separator 113a, the first electrode 111, the separator 113b, and the second electrode 112 are sequentially disposed at positions adjacent to the short circuit member 160.

The first electrode 111 may include a first metal foil 111a (e.g., aluminum foil) and a first active material 111b (e.g., lithium-based oxide). Also, the second electrode 112 may include a second metal foil 112a (e.g., copper foil) and a second active material 112b (e.g., graphite).

To form the short circuit member 160, the second electrode 112 may extend farther than the first electrode 111. Thus, the short circuit member 160 and the second electrode 112 have the same material and configuration. However, the short circuit member 160 may be formed of copper, aluminum, or any other suitable material.

Referring to FIG. 2C, a short circuit member 260 may include only the second metal foil extending from the second electrode 112 of the electrode assembly 110. That is, the short circuit member 260 may not include the second active material. The short circuit member 260 may include copper foil. In addition, the separators 113a and 113b may be disposed on both lateral surfaces of the short circuit member 260, respectively. Also, although the short circuit member 260 is wound about two times in FIG. 2B, embodiments of the present invention are not limited thereto.

When the secondary battery 100 having the above-described structure is punctured or collapsed, a short circuit between the short circuit member 160 or 260 and an inner surface of the can 120 occurs. For example, the short circuit member 160 or 260 may have a negative charge, and the can 120 may have a positive charge. Since a portion of the second electrode 112 extends to form the short circuit member 160 or 260, a short circuit between the can 120 and the short circuit member 160 short circuits the entire electrode assembly 110. As the short circuit member 260 on which the active material is not disposed has a low resistivity, little heat is generated. That is, the secondary battery 100 does not generate much heat, and the electric energy of the secondary battery 110 is quickly removed.

For example, the secondary battery 100 according to an embodiment does not exceed a temperature ranging from about 50° C. to about 100° C. when the secondary battery 100 is punctured or collapsed. In addition, since the can 120 may be formed of a metal having low resistivity, when the secondary battery 100 is punctured or collapsed, the secondary battery 100 generates relatively little heat, and the electric energy of the secondary battery 100 is quickly removed.

Figure 3:
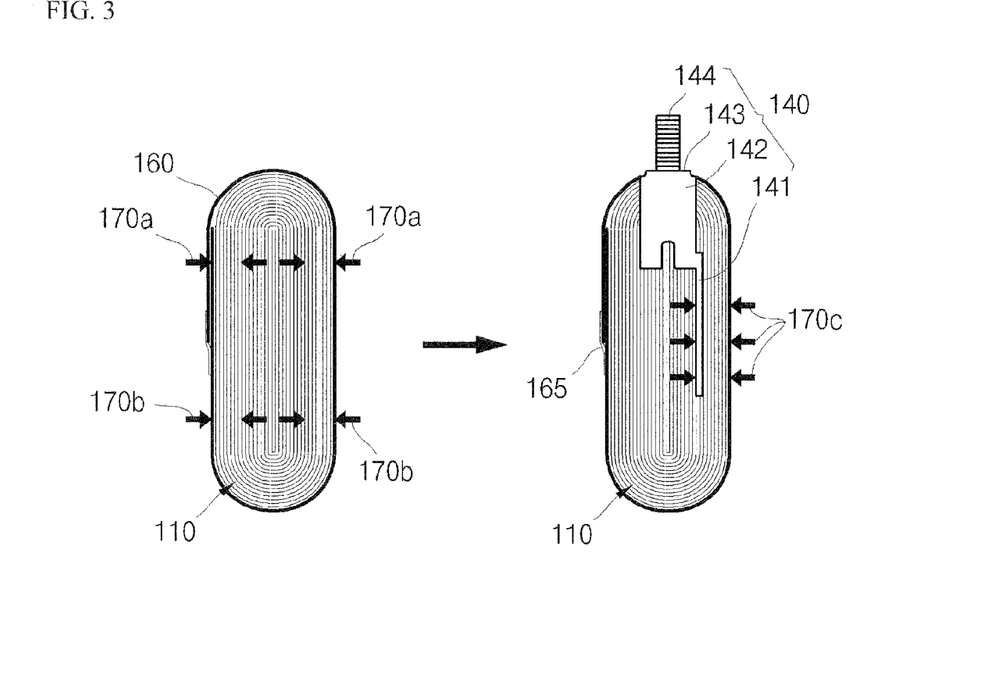
FIG. 3 illustrates a process in which an electrode assembly, a short circuit member, and an electrode terminal are welded to each other according to an exemplary embodiment of the present invention.

FIG. 3 illustrates a process in which an electrode assembly, a short circuit member, and an electrode terminal are welded to each other according to an exemplary embodiment of the present invention.

Referring to FIG. 3, the electrode assembly 110 and the short circuit member 160 extends beyond the electrode assembly 110 by a distance, and the short circuit member 160 and the electrode to which the short circuit member 160 is extending from may be welded to each other in a plurality of regions. The welding process may include a resistance welding process, an ultrasonic welding process, and a laser welding process. However, any suitable welding process may be used. Arrows 170a and 170b of FIG. 3 represent welding points between the electrode assembly 110 and the short circuit member 160.

The electrode terminal 140 may be coupled to the electrode assembly 110. That is, the welding region 141 of the electrode terminal 140 may be coupled to the electrode assembly 110. More specifically, the welding region 141 of the first electrode terminal 140, which is not electrically connected to the cap plate, is coupled to a gap in the first uncoated region of the second electrode of the electrode assembly 110.

At this time, the welding region of the first electrode terminal is coupled to a gap in the first uncoated region of the first electrode of the electrode assembly 110. Only the second electrode terminal 140 is illustrated in FIG. 3.

The welding region 141, the second uncoated region of the second electrode of the electrode assembly 110, and the short circuit member 160 may be welded to each other. That is, after the second uncoated region of the second electrode of the electrode assembly 110 and the short circuit member 160 are attached to the welding region 141 of the electrode terminal 140, the welding region 141, the electrode assembly 110, and the second uncoated region may be welded to each other using suitable resistance welding, ultrasonic welding, laser welding, or any other suitable welding method.

Reference numeral 170c of FIG. 3 represents a welding point between the welding region 141 of the electrode terminal 140, the electrode assembly 110, and the short circuit member 160. Here, the welding region 131 and the first uncoated region of the first electrode of the electrode assembly 110 may be welded to each other.

Figure 4A:
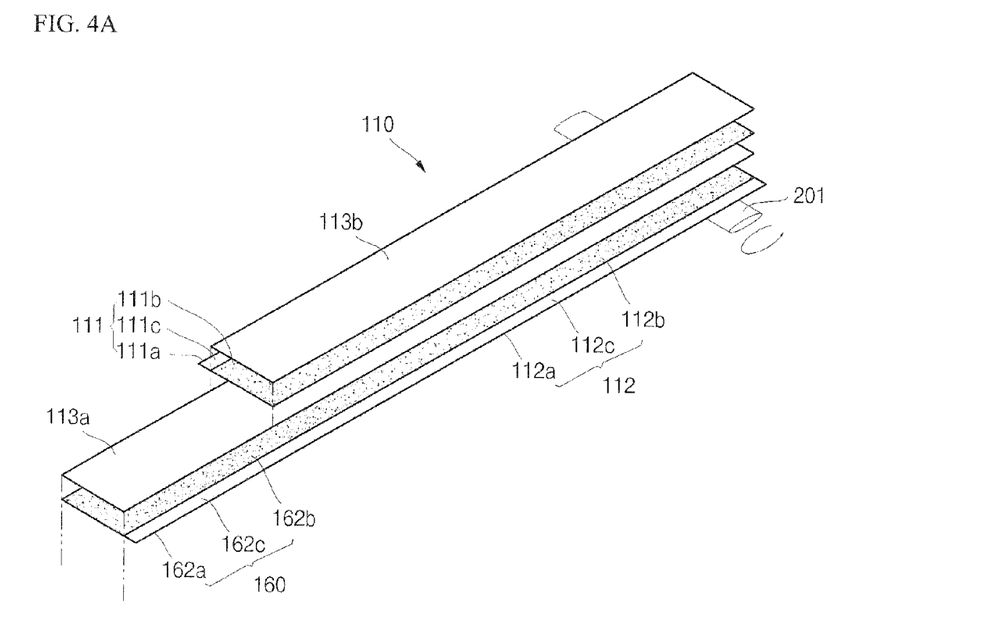
FIGS. 4A and 4B illustrate perspective views of an electrode assembly according to an exemplary embodiments of the present invention where the short circuit member and the electrode assembly are not yet wound.
Figure 4B:
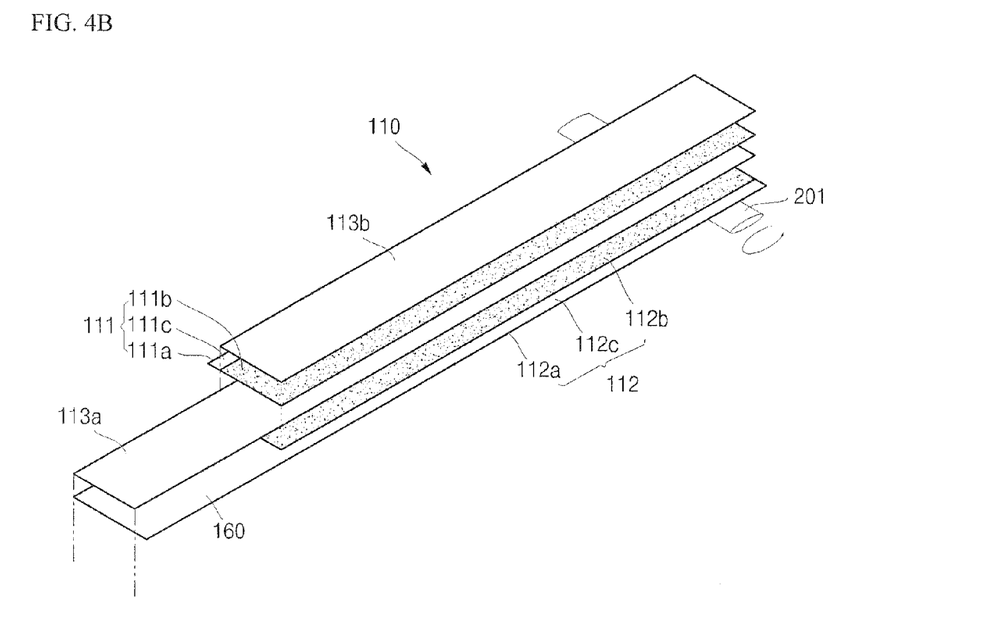

FIGS. 4A and 4B illustrate perspective views of an electrode assembly according to an exemplary embodiments of the present invention where the short circuit member and the electrode assembly are not yet wound.

Referring to FIG. 4A, the short circuit member 160 extends from an end in a longitudinal direction of the second electrode 112 by a given length. That is, the second electrode 112 and the short circuit member 160 have a length greater than that of the first electrode 111. Also, since the separator 113a is disposed on an upper portion of the short circuit member 160 extending from the second electrode 112, the separator 113a has a length equal to or greater than the sum of lengths of the second electrode 112 and the short circuit member 160.

Also, since the second electrode 112 of the electrode assembly 110 extends to form the short circuit member 160, the short circuit member 160 has the substantially same structure as the second electrode 112. That is, the short circuit member 160 may include the second metal foil 162a, the second active material 162b coated on the second metal foil 162a, and the second uncoated region 162c which extends beyond the separator 113a.

The second electrode 112 may include the second metal foil 112a, the second active material 112b coated on the second metal foil 112a, and the second uncoated region 112c which extends beyond the separator 113a.

The second uncoated region 162c of the short circuit member 160 and the second uncoated region 112c of the second electrode 112 extend beyond the separator 113a. That is, the second uncoated region 162c and the second uncoated region 112c protrude in a front direction of the separator 113a.

In addition, the first electrode 111 is disposed on the separator 113a. The first electrode 111 includes the first metal foil 111a, the first active material 111b coated on the first metal foil 111a, and the first uncoated region 111c extends beyond the separator 113a. Furthermore, the other separator 113b is disposed on the first electrode 111. The first uncoated region 111c of the first electrode 111 extends beyond the separator 113b. That is, the first uncoated region 111c protrudes in a rear direction of the separator 113b.

Thus, the first uncoated region 111c of the first electrode 111 protrudes in a direction opposite to that of the second uncoated region 112c of the second electrode 112. Also, the second uncoated region 162c of the short circuit member 160 protrudes in a direction equal to that of the second uncoated region 112c and opposite to that of the first uncoated region 111c.

The second electrode 112, the separator 113a, the first electrode 111 and the separator 113b may be stacked and wound in a substantially counterclockwise direction by a wind shaft 201. Thus, as the short circuit member 160 extending from the second electrode 112 has a length greater than that of the first electrode 111, the short circuit member 160 is wound about one to about seven times around an exterior surface of the electrode assembly. The wind shaft 201 may be separated from the electrode assembly after a winding process of the electrode assembly is completed.

Therefore, the second uncoated region 112c of the second electrode 112 and the second uncoated region 160c of the short circuit member 160 are electrically connected and welded to each other.

Referring to FIG. 4B, the short circuit member 260 may extend from the end, in the longitudinal direction, of the second electrode 112 of the electrode assembly 110 by a given length. Here, the second active material may not be included on the short circuit member 260. That is, a metal of the short circuit member 260 may be exposed. The separator 113a is disposed on the upper portion of the short circuit member 260 on which the active material is not disposed to prevent the short circuit member 260 from being electrically short circuited to the inner surface of the can after the short circuit member 260 is wound. The short circuit member 260 may be made of the second metal foil that is one of the components of the second electrode 112.

Therefore, since the short circuit member 260 is formed of a material having a relatively low resistivity, the secondary battery 110 generates less heat, and the energy of the secondary battery may be quickly consumed when the secondary battery 110 is punctured or collapsed.

Figure 5A:
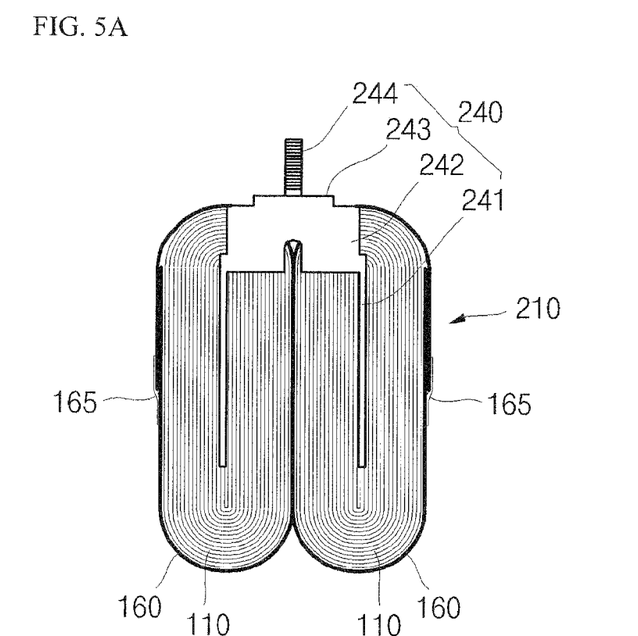
FIGS. 5A and 5B illustrate sectional views of an electrode assembly of a secondary battery according to another exemplary embodiment of the present invention.
Figure 5B:
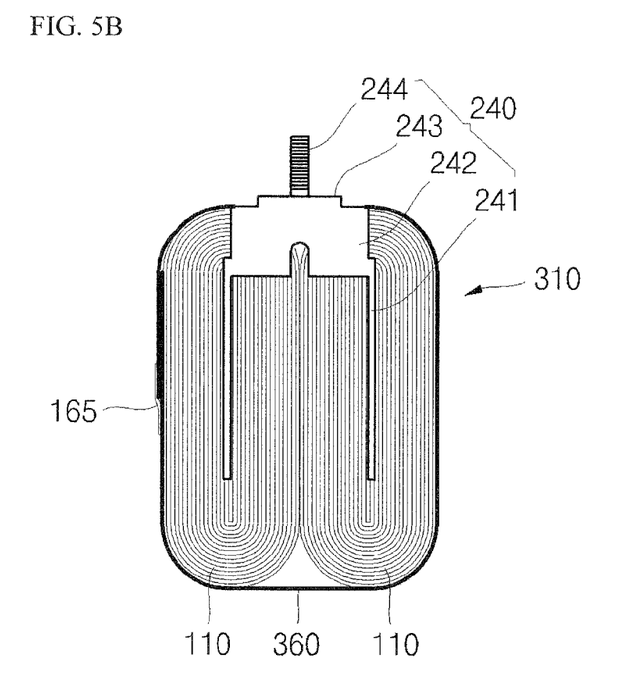

FIGS. 5A and 5B illustrate sectional views of an electrode assembly of a secondary battery according to another exemplary embodiment of the present invention.

Referring to FIG. 5A, an electrode assembly 210 may be provided in a pair 110. In addition, two short circuit member 160 may be independently wound around each of the electrode assemblies 110. Each of the electrode assemblies 110 is electrically connected to the electrode terminal 240. Here, the electrode terminal 240 includes two welding regions 241, a first extension 242, a second extension 243, and a bolt extension 244. Also, the welding region 241 is inserted into each of the electrode assemblies 110. The short circuit member 160 and the electrode assemblies 110 are welded to the welding regions 241 using a suitable welding method. As a result, the capacity of a secondary battery increases, and also, the electrode assembly 210 is quickly and forcedly short circuited when the secondary battery is punctured or collapsed.

Referring to FIG. 5B, an electrode assembly 310 may be provided in a pair 110. Moreover, one short circuit member 360 may be integrally wound around the pair of electrode assemblies 110. That is, one short circuit member 360 may completely cover the pair of electrode assemblies 110. Thus, the capacity of a secondary battery increases, and also, the secondary battery is quickly and forcedly short circuited. Furthermore, since the electrode assemblies 310 are completely covered by one short circuit member 360, the electrode assemblies 310 may be easily handled.

Figure 6A:
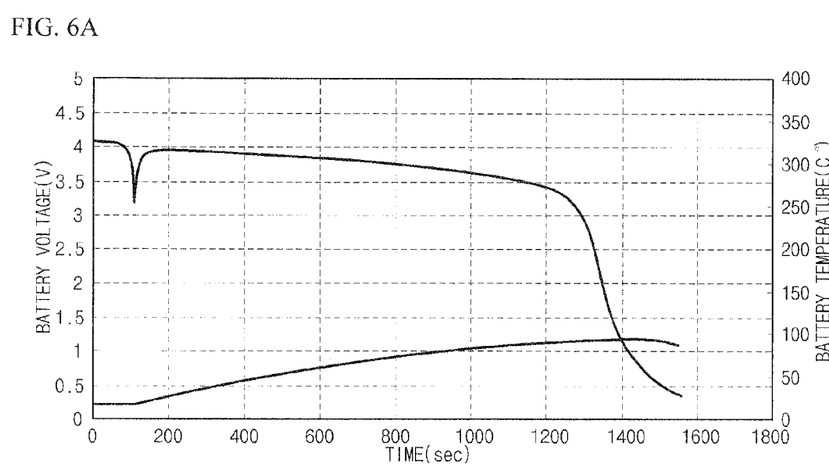
FIG. 6A is a graph of voltage-temperature characteristics of a secondary battery without a short circuit member that is puncture or collapsed.
Figure 6B:
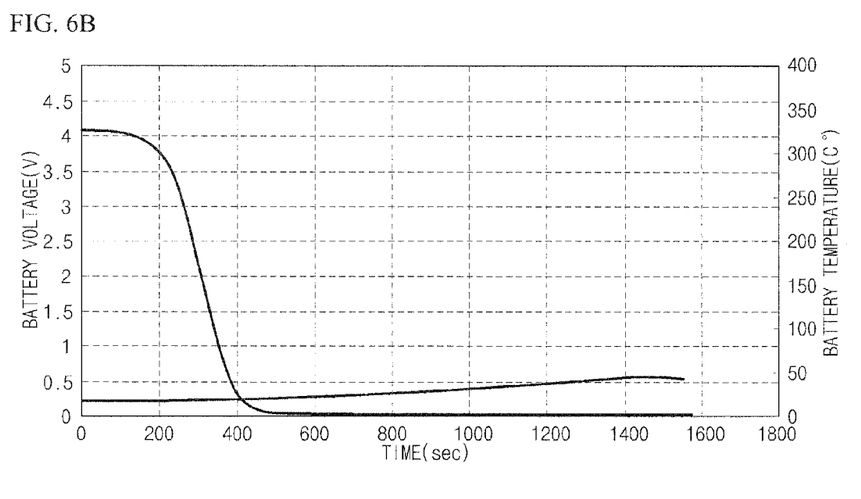
FIG. 6B is a graph of voltage-temperature characteristics when a secondary battery including a short circuit member is punctured or collapsed.

FIG. 6A is a graph of voltage-temperature characteristics of a secondary battery without a short circuit member that is puncture or collapsed, and FIG. 6B is a graph of voltage-temperature characteristics when a secondary battery including a short circuit member is punctured or collapsed.

In FIGS. 8A and 8B, the X-axis represents an elapsed time (in minutes). A left Y-axis represents a voltage (V), and a right Y-axis represents a temperature (° C.). Also, a test was performed under following conditions: residual capacity is about 90%, an open circuit voltage is about 4.1 V, and a nail having a diameter of about 3 mm is penetrated into the secondary battery at a speed of about 80 mm/sec.

Referring to FIG. 6A, in a case of a secondary battery in which a short circuit member includes an active material, after the penetration started, a voltage of the secondary battery was slightly dropped, and then rose again. Thereafter, the voltage of the secondary battery was dropped in a smoothly curved shape to approach about 0 V.

Although the secondary battery gradually increased in temperature, the secondary battery did not exceed a temperature of about 100° C. That is, the secondary battery was maintained at a temperature ranging from about 50° C. to about 100° C. Thus, in the case of the secondary battery in which the short circuit member includes the active material, since the secondary battery does not exceed the permissible temperature when the secondary battery is punctured and collapsed, the safety and reliability of the secondary battery are both improved.

Referring to FIG. 6B, in a case of a secondary battery in which a short circuit member does not include the active material, after the puncture started, a voltage of the secondary battery was dropped to about 0 V. Although the secondary battery gradually increased in temperature, the secondary battery did not exceed a temperature of about 70° C. That is, the secondary battery was maintained at a temperature ranging from about 50° C. to about 70° C. Thus, in the case of the secondary battery in which the short circuit member does not include the active material, as the secondary battery does not exceed the permissible temperature when the secondary battery is punctured and collapsed, the safety and reliability of the secondary battery are both improved.

In addition, in the case where the short circuit member includes the active material (e.g., graphite), as the second electrode is extended by a certain length to form the short circuit member, the manufacturing process of a rechargeable battery is simplified. However, it was confirmed that the secondary battery increases up to a temperature ranging from about 50° C. to about 100° C. when the secondary battery is punctured and collapsed.

In the case where the short circuit member does not include active material, since a separate processes (a process for removing the active material, or a process for preventing the active material from being coated) is performed on the second electrode, the manufacturing process thereof may be complicated. However, the secondary battery increases up to only a temperature ranging from about 50° C. to about 70° C. when the secondary battery is punctured and collapsed. Therefore, the safety and reliability of the secondary battery having a short circuit member without active material is relatively improved when compared to a secondary battery having a short circuit member including an active material.

As above-described, in the case where the short circuit member does not include the active material, for example, copper has resistivity of about $1.72 \times 10^{-8}\,\Omega\cdot m$, and aluminum has resistivity of about $2.75 \times 10^{-8}\,\Omega\cdot m$. That is, copper and aluminum have lower resistivity when compared to that of the graphite. Thus, when the short circuit member formed of a copper or aluminum material is short circuited, a large current is consumed, and little heat is generated.

While this disclosure has been described in connection with what is presently considered to be practical exemplary embodiments, it is understood that the invention is not limited to the disclosed embodiments, but, on the contrary, is intended to cover various modifications and equivalent arrangements included within the sprit and scope of the appended claims.

What is claimed is:

1. A rechargeable battery comprising:
an electrode assembly comprising a first electrode configured to have a first polarity, a second electrode configured to have a second polarity, and a separator between the first electrode and the second electrode, the electrode assembly having a jelly roll shape with an inner end proximal to the center of the jelly roll and a second end distal to the center of the jelly roll, a first lateral side, and a second lateral side facing oppositely away from the first lateral side;
a case containing the electrode assembly and electrically connected to the second electrode;
a cap plate coupled to the case; and
a short circuit member electrically connected to the first electrode and wound around the electrode assembly,
wherein the first electrode comprises a first uncoated region extending to the first lateral side of the electrode assembly, and a portion of the short circuit member is welded to the first uncoated region and wherein the rechargeable battery further comprises a second electrode assembly inside the case, wherein the short circuit member is integrally wound around all the electrode assemblies.

2. The rechargeable battery of claim 1, wherein an end of the short circuit member overlaps a boundary between the short circuit member and the first electrode.

3. The rechargeable battery of claim 1, wherein the short circuit member is wound around the electrode assembly up to seven times.

4. The rechargeable battery of claim 1, wherein a separator is on both sides of the short circuit member.

5. The rechargeable battery of claim 1, wherein the short circuit member comprises a metal foil.

6. The rechargeable battery of claim 1, wherein the short circuit member comprises a metal foil with an active material.

7. The rechargeable battery of claim 1, wherein the short circuit member comprises a metal foil selected from the group consisting of copper and aluminum.

8. The rechargeable battery of claim 1, wherein the short circuit member comprises a different metal than that of the case.

9. The rechargeable battery of claim 1, further comprising a first electrode terminal, wherein the short circuit member, the first uncoated region, and the first electrode terminal are electrically connected.

10. The rechargeable battery of claim 1, wherein the first electrode comprises a metal foil and an active material, wherein a portion of the first electrode is longer than the second electrode and the portion of the first electrode extending beyond the second electrode is the short circuit member, and wherein the short circuit member comprises a portion of the metal foil and a portion of the active material.

11. The rechargeable battery of claim 1, wherein the first electrode comprises a metal foil, wherein the metal foil of the first electrode extends beyond the second electrode to form the short circuit member.

12. The rechargeable battery of claim 1, wherein the short circuit member is configured to short circuit the electrode assembly when the case is electrically connected with the short circuit member.

13. The rechargeable battery of claim 1 wherein the first lateral side is a left side of the electrode assembly, and the second lateral side is a right side of the electrode assembly.

* * * * *